(12) United States Patent
Bergon et al.

(10) Patent No.: US 8,435,378 B2
(45) Date of Patent: *May 7, 2013

(54) PROCESS FOR TRANSFERRING COATINGS ONTO A SURFACE OF A LENS SUBSTRATE WITH MOST PRECISE OPTICAL QUALITY

(75) Inventors: Cedric Bergon, Charenton le Pont (FR); Peiqi Jiang, Tarpon Springs, FL (US); Alexandra Roos, Charenton le Pont (FR); Steven Weber, Clearwater, FL (US)

(73) Assignee: Essilor International Compagnie General d'Optique, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/009,598

(22) Filed: Jan. 19, 2011

(65) Prior Publication Data
US 2011/0129599 A1     Jun. 2, 2011

Related U.S. Application Data

(63) Continuation of application No. 11/381,225, filed on May 2, 2006, now Pat. No. 7,993,482, which is a continuation-in-part of application No. 11/098,312, filed on Apr. 4, 2005, now abandoned.

(51) Int. Cl.
| | | |
|---|---|---|
| B29D 11/00 | (2006.01) |
| B44C 1/16 | (2006.01) |
| B44C 1/20 | (2006.01) |
| B44C 1/24 | (2006.01) |
| B32B 37/06 | (2006.01) |
| B32B 37/10 | (2006.01) |
| B32B 37/12 | (2006.01) |
| B32B 37/16 | (2006.01) |
| C09J 5/06 | (2006.01) |
| B44C 1/175 | (2006.01) |
| C09J 5/02 | (2006.01) |
| C09J 5/04 | (2006.01) |
| B32B 37/04 | (2006.01) |

(52) U.S. Cl.
USPC ........ 156/307.5; 156/230; 156/237; 156/242; 156/244.12; 156/244.22; 156/307.3; 427/162; 427/164

(58) Field of Classification Search .................. 156/230, 156/237, 242, 244.12, 244.22, 307.3, 307.5; 427/162, 164
See application file for complete search history.

(56) References Cited

U.S. PATENT DOCUMENTS

| | | | |
|---|---|---|---|
| 2,372,929 A | 4/1945 | Blessing | 428/164 |
| 3,444,732 A | 5/1969 | McKinley et al. | 73/150 A |

(Continued)

FOREIGN PATENT DOCUMENTS

| | | |
|---|---|---|
| EP | 0404111 | 12/1990 |
| EP | 614957 | 9/1994 |

(Continued)

OTHER PUBLICATIONS

Definition of "Flow", Merriam-Webster Dictionary, available online at http://www.meriam-webster.com/thesaurus/flow, accessed Sep. 2010.

(Continued)

*Primary Examiner* — Sonya Mazumdar
(74) *Attorney, Agent, or Firm* — Fulbright & Jaworski L.L.P.

(57) ABSTRACT

The present invention relates to a process for transferring at least one coating onto at least one geometrically defined surface of a lens substrate to produced a lens substrate coated with at least one functional coating adhering to at least one geometrically defined surface through a layer of transparent adhesive composition.

29 Claims, 7 Drawing Sheets

U.S. PATENT DOCUMENTS

| | | | | |
|---|---|---|---|---|
| 4,061,518 | A | 12/1977 | Burroughs et al. | 156/232 |
| 4,064,518 | A | 12/1977 | Douglas | 396/34 |
| 4,190,621 | A * | 2/1980 | Greshes | 264/1.8 |
| 4,211,823 | A | 7/1980 | Suzuki et al. | 428/412 |
| 4,242,162 | A | 12/1980 | Ronning et al. | 156/212 |
| 4,287,227 | A * | 9/1981 | Kamada et al. | 427/515 |
| 4,374,158 | A | 2/1983 | Taniguchi et al. | 427/536 |
| 4,425,403 | A | 1/1984 | Taniguchi et al. | 428/331 |
| 4,679,918 | A | 7/1987 | Ace | 351/163 |
| 4,885,332 | A * | 12/1989 | Bilkadi | 524/714 |
| 4,927,480 | A | 5/1990 | Vaughan | 156/228 |
| 5,007,975 | A * | 4/1991 | Yamamoto et al. | 156/154 |
| 5,015,523 | A | 5/1991 | Kawashima et al. | 428/336 |
| 5,047,447 | A * | 9/1991 | Gallas | 523/106 |
| 5,145,884 | A * | 9/1992 | Yamamoto et al. | 522/14 |
| 5,152,863 | A * | 10/1992 | Manos | 156/331.5 |
| 5,316,791 | A | 5/1994 | Farber et al. | 427/164 |
| 5,512,371 | A | 4/1996 | Gupta et al. | 428/412 |
| 5,985,420 | A * | 11/1999 | Haga et al. | 428/212 |
| 6,033,518 | A | 3/2000 | Backfisch | 156/295 |
| 6,242,065 | B1 | 6/2001 | Blomberg et al. | 428/64.1 |
| 6,335,124 | B1 | 1/2002 | Mitsui et al. | 430/5 |
| 6,500,516 | B2 | 12/2002 | Bourlier et al. | 428/116 |
| 6,503,631 | B1 | 1/2003 | Faverolle et al. | 428/447 |
| 6,562,466 | B2 | 5/2003 | Jiang et al. | 428/412 |
| 6,624,237 | B2 | 9/2003 | Biteau et al. | 524/588 |
| 6,740,699 | B2 | 5/2004 | Tardieu et al. | 524/481 |
| 6,759,090 | B2 | 7/2004 | Loshak et al. | 428/412 |
| 6,770,710 | B2 | 8/2004 | Robert et al. | 524/832 |
| 6,911,005 | B2 | 6/2005 | Ouchi et al. | 600/121 |
| 6,913,357 | B2 * | 7/2005 | Kadowaki | 351/159.74 |
| 6,919,134 | B2 | 7/2005 | Mitsuishi et al. | 428/447 |
| 6,986,857 | B2 | 1/2006 | Klemm et al. | 264/2.5 |
| 7,008,690 | B2 * | 3/2006 | Caron et al. | 428/306.6 |
| 2010/0163165 | A1 * | 7/2010 | Jiang et al. | 156/230 |

FOREIGN PATENT DOCUMENTS

| | | |
|---|---|---|
| EP | 0796719 | 9/1997 |
| EP | 1161512 | 2/2004 |
| EP | 1426168 | 2/2005 |
| JP | 63-87223 | 4/1988 |
| JP | 63-141001 | 6/1988 |
| WO | WO 93/21010 | 10/1993 |
| WO | WO 94/10230 | 5/1994 |
| WO | WO 95/13904 | 5/1995 |
| WO | WO 97/35216 | 9/1997 |
| WO | WO 99/24243 | 5/1999 |
| WO | WO 03/004255 | 1/2003 |

OTHER PUBLICATIONS

Office Communication, issued in U.S. Appl. No. 11/381,225, dated Jan. 22, 2008.
Office Communication, issued in U.S. Appl. No. 11/381,225, dated Jul. 31, 2008.
Office Communication, issued in U.S. Appl. No. 11/381,225, dated Feb. 18, 2009.
Office Communication, issued in U.S. Appl. No. 11/381,225, dated Oct. 27, 2009.
Office Communication, issued in U.S. Appl. No. 11/381,225, dated Apr. 5, 2010.
Office Communication, issued in U.S. Appl. No. 11/381,225, dated Sep. 15, 2010.
Office Communication, issued in U.S. Appl. No. 11/381,225, dated Feb. 11, 2011.
Office Communication, issued in U.S. Appl. No. 11/098,312, dated Jan. 22, 2008.
Owens et al., "Estimation of the surface force energy of polymers," *J. Appl. Polym. Sci.*, 51:1741-1747, 1969.
Sobieski et al., Handbook of Pressure-Sensitive Adhesive Technology, $2^{nd}$ ed., D. Satas, ed., pp. 508-517, 1989.

* cited by examiner

PROCESS FOR TRANSFERRING COATINGS ONTO A SURFACE OF A LENS SUBSTRATE WITH MOST PRECISE OPTICAL QUALITY

CROSS-REFERENCE TO RELATED APPLICATIONS

This application is a continuation of U.S. patent application Ser. No. 11/381,225, filed May 2, 2006, which is a continuation-in-part of U.S. patent application Ser. No. 11/098,312, filed Apr. 4, 2005, and also claims priority to International Application No. PCT/EP2006/003452 field Apr. 4, 2006. The entire text of each of the above-referenced disclosures is specifically incorporated by reference herein without disclaimer.

BACKGROUND OF THE INVENTION

1. Field of the Invention

The present invention relates to an improved process or method for transferring at least one coating onto at least one geometrically defined surface of a lens substrate, which can be implemented in a short period of time without any risk of deformation of the lens substrate, which avoids the use of a liquid curable adhesive composition for adhesion of the coating to the lens substrate and results in the coating adhering to the lens substrate through an adhesive layer of uniform thickness.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an anti-reflection coating and, optionally, an anti-fouling top coat. Other coatings such as a polarized coating, a photochromic or a dyeing coating may also be applied onto one or both surfaces of the lens substrate.

Numerous processes and methods have been proposed for coating a surface of an ophthalmic lens and are disclosed.

U.S. Pat. No. 6,562,466 describes one process or method for transferring a coating from at least one mold part onto at least a geometrically defined surface of a lens blank comprising:

providing a lens blank having at least one geometrically defined surface;
providing a support or mold part having an internal surface bearing a coating and an external surface;
depositing on said geometrically defined surface of said lens blank or on said coating a pre-measured amount of a curable adhesive composition;
moving relatively to each other the lens blank and the support to either bring the coating into contact with curable adhesive composition or bring the curable adhesive composition into contact with the geometrically defined surface of the lens blank;
applying a sufficient pressure onto the external surface of the support so that the thickness of a final adhesive layer once the curable composition cured is less than 100 micrometers;
curing the layer of adhesive composition; and
withdrawing the support or mold part to recover the lens blank with the coating adhered onto the geometrically defined surface of said lens blank.

U.S. Pat. No. 6,562,466 uses a liquid light or thermal curable adhesive composition to transfer the coating layers from the carrier to the surface of the lens substrate. The liquid curable adhesive composition is required to stick both to the exposed coating on the carrier and the geometrically defined surface of the lens substrate. The process requires to precisely dropping the liquid adhesive composition, either too much or too less of the liquid adhesive needs to be avoided, which renders the process more complicated and less cost effective. Furthermore, this process may cause optical distortions when the liquid adhesive composition is not spread out very evenly on the lens curved surface. In particular, when the liquid adhesive composition is spread using air pressure (inflatable membrane apparatus) applied on a flexible coating carrier, the applied pressure may not usually be uniform over the whole carrier surface, resulting in an uneven spreading of the liquid adhesive composition and a final cured adhesive layer having some variations in thickness.

SUMMARY OF THE INVENTION

Therefore, one object of the invention is to provide a process or method for transferring at least one coating from a carrier onto a geometrically defined surface of a lens substrate, which avoids the drawbacks of the prior art processes and in particular avoids the use of a flowable liquid curable adhesive composition.

A further object of the invention is to provide a process or method as above, which results in a coated lens substrate in which the coating(s) adhere(s) to the lens substrate surface through an adhesive layer of very uniform thickness.

According to the invention, there is provided a process for transferring at least one coating onto at least one geometrically defined surface of a lens substrate, which comprises the steps of:

(a) obtaining a carrier having a main surface bearing at least one functional coating;
(b) obtaining a lens substrate having at least one geometrically defined surface;
(c) depositing, either on said at least one functional coating or said at least one geometrically defined surface of the lens substrate, a layer of a transparent adhesive composition;
(d) bringing said layer of transparent adhesive composition to a state at which the layer becomes unflowable under the process conditions if said layer is not already in such a state at the end of step (c);
(e) moving the carrier and the lens substrate relatively to each other to bring the layer of transparent adhesive composition into direct contact with either said at least one geometrically defined surface of the lens substrate or said at least one functional coating;
(f) pressing together the layer of transparent adhesive composition and either said at least one functional coating or said at least one geometrically defined surface of the lens substrate;
(g) optionally, applying heat during pressing step (f);
(h) stopping pressing step (f); and
(i) withdrawing the carrier to recover the lens substrate coated with said at least one functional coating adhering to said at least one geometrically defined surface through the layer of transparent adhesive composition.

In one embodiment of the process of the invention, the main surface of the carrier, preferably a flexible carrier, bears a stack of several functional coatings. Of course, the coatings are then applied on the surface of the carrier in the reverse order with regard to the desired order of the coating stack on the lens substrate.

Preferably, the at least one functional coating is transferred on a geometrically defined surface of the rear surface of the lens substrate. In such a case, the coating transfer process is referred to as a BST (back side transfer) process. Of course, geometrically defined surfaces of front surface or both rear and front surface of the lens substrate can be coated using the process of the invention. The rear surface (generally the concave surface) of the lens substrate is the surface of the lens substrate which, in use, is the closest to the wearer's eye. The front surface (generally the convex surface) of the lens substrate is the surface of the lens substrate which, in use, is the farthest from the wearer's eye.

The ophthalmic articles which can be treated by the process of the invention are finished or semi-finished articles preferably comprising a transparent polymer substrate.

The geometrically defined surface of the lens substrate to be coated in this invention may be a spherical, toric or progressive surface, provided that an adequate spherical flexible carrier is employed.

The present invention also encompasses the case in which the transparent adhesive composition layer is pre-deposited and brought to a state at which the layer is unable to flow, either on a functional coating borne by a carrier or on a geometrically defined surface of a lens substrate, which may be stored and later used in the process steps e) to i) of the invention.

In a preferred embodiment of the process of the invention, the transparent adhesive composition is selected from the group consisting of pressure-sensitive adhesives (PSA) and hot-melt adhesives (HMA).

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein:

FIG. 3 is related to example 1;

FIG. 4 is related to comparative example 1;

DETAILED DESCRIPTION OF THE INVENTION AND PREFERRED EMBODIMENTS

Figure 1A:
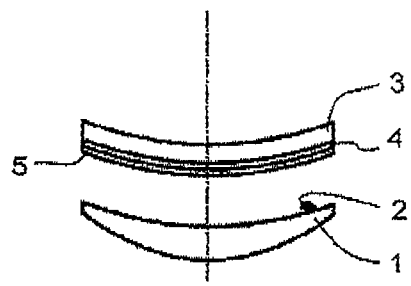
FIGS. 1A to 1C are schematic views of the main steps of a first embodiment of the process of the invention for transferring at least one coating onto at least one geometrically defined surface of a lens substrate, in which the layer of a transparent adhesive composition is deposited on at least one functional coating.

In this patent application, when one refers to the base curvature of the carrier, one means the base curvature of the working surface of the carrier, that is to say the surface which bears the coatings to be transferred to the geometrically defined surface of the lens substrate, after withdrawal of the carrier.

In the same way, base curvature of the lens substrate means the base curvature of the surface which bears the coatings that are going to be transferred. In this application, the base curvature has the following definition:

For a spherical surface, having a radius of curvature R, base curvature (or base)=530/R (R in mm). Such a definition is quite classical in the art. For a toric surface: a toric surface has two principal meridians, of radii R and r with R>r, and it is possible to calculate two base curvatures BLR and BLr (BLR<BLr) corresponding respectively to radii of curvature R and r defining the toric surface.

The base curvature (or base) is defined as the ratio 530/radius of curvature (in mm). Thus, $$BLR = \frac{530}{R} \text{ and } BLr = \frac{530}{r}$$

with R and r in mm.

Preferably, the carrier used in the present invention has a spherical shape and has a base curvature BC.

Base curvatures BLR and BLr of the above toric surface and the base curvature of the carrier BC preferably shall satisfy the following relationships:
a) if $BLr-BLR \leq 3.5$
  $0<BC-BLR<3$ and $|BC-BLr|<1$
preferably:
  $0.2<BC-BLR<2.5$ and $|BC-BLr|<0.5$
b) if $BLr-BLR>3.5$
  $BLR<BC<BLr$ When using a rigid carrier, preferably the base curvature of the carrier is the same as the base curvature of the lens substrate.

Preferably, when moving relatively to each other the carrier and the lens substrate, the pressure is applied first on the center part of the carrier and in a second step the pressure is radially increased towards the periphery of the lens substrate.

In the case of a flexible carrier and a coating transfer on the back surface of the lens substrate, the convex front face of the carrier may have a shorter radius of curvature than the concave surface of the lens substrate to be coated.

The pressure is applied at the center and the carrier is then deformed to conform to the geometrically defined surface of the lens substrate.

The diameter of the carrier could be either higher than the diameter of the lens blank or smaller than the diameter of the lens blank.

The lens substrate for use in the present process can be any transparent substrate, preferably any plastic material transparent substrate commonly used in the optical field. The lens substrate is generally a lens or lens blank, preferably an ophthalmic lens or lens blank, more preferably a lens blank. The main faces of an ophthalmic lens blank, such as a lens blank made of a transparent plastic material, are classically subjected to a surface mechanical treatment.

This mechanical treatment comprises a group of operations leading to the production of a lens blank, the main faces of which are perfectly polished and have the desired curvatures (optical powers).

The mechanical treatment typically comprises three successive steps: grinding, fine grinding (also called fining) and polishing.

Grinding is a mechanical processing step intended to create the curvature on the face of the lens blank.

Fine grinding (fining), performed after grinding further changes the geometry of the treated face of the lens blank but can lead to a translucent lens blank, the treated face of which still shows significant surface roughness.

Finally, the polishing, a relatively long mechanical processing step, which usually does not change the geometry of the treated face, removes the remaining roughness as far as possible to give the final transparent lens blank. The lens substrate used in the present invention may be polished or only fined without being polished.

The lens blank used in the present invention can be a finished lens, i.e. a lens obtained in its definitive shape, having both of its main faces surfaced or cast to the required geometry. It is generally produced by pouring polymerizable compositions between two molds exhibiting required surface geometries and then polymerizing. The lens blank can also be a semi-finished lens, i.e. a lens which comprises after molding only one of its main faces surfaced or cast to the required geometry, and wherein preferably one face of the lens, preferably the front face of the lens, has previously been treated with an appropriate coating (anti-reflection, hard coat, primer coating, impact resistant coating, etc. . . . ) and the remaining face, preferably the rear face of the lens, is coated using the process of the invention. Its second face has then to be surface-finished as required. The lens blank can also be a polarized lens or a photochromic lens.

The geometrically defined surface of the lens substrate (preferably the rear (concave) surface) on which the coatings are to be transferred may be a spherical, toric or progressive surface. By geometrically defined surface of the lens substrate there is meant either an optical surface, that is a surface of required geometry and smoothness or a surface having a required geometry but that still exhibits some roughness, such as a surface that has been grinded and fined, but not polished.

The state of the surface of a lens substrate being fined without being polished can also be expressed in terms of Rq. Typically, the Rq of the fined face is above 0.01 µm, and preferably ranges from 0.01 µm to 0.5 µm, more preferably from 0.05 to 0.25 µm. Typically, the surface roughness Rq of the polished face of a lens blank is under 0.01 µm, preferably around 0.005 µm. Rq is determined as follows:

A TAYLOR HOBSON FTS (From Talysurf Series 2) profilometer/roughness measuring systems is advantageously used to determine the root-mean-square profile height Rq (2DRq) of the surface (also referred as roughness Rq before). The system includes a laser head (product reference 112/2033-541, for example) and a 70 mm long feeler (product reference 112/1836) having a 2 mm radius spherical/conical head. The system measures a two-dimensional profile in the chosen section plane to obtain a curve Z=f(x). The profile is acquired over a distance of 20 mm. Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:
  acquisition of the profile Z=f(x),
  shape extraction,
  filtering (mean line extraction), and
  determination of parameter Rq.

The profile acquisition step consists in moving the stylus of the aforementioned system over the surface of the lens in question, to store the altitudes Z of the surface as a function of the displacement x. In the shape extraction step, the profile obtained in the previous step is related to an ideal sphere, i.e. a sphere with minimum profile differences relative to that sphere. The mode chosen here is the LS arc mode (best circular arc extraction). This provides a curve representative of the characteristics of the profile of the surface in terms of undulation and roughness. The filtering step retains only defects corresponding to certain wavelengths. The aim is to exclude undulations, a form of defect with wavelengths higher than the wavelengths of defects due to roughness. Here the filter is of the Gaussian type and the cut-off used is 0.25 mm.

Rq is determined from the curve obtained using the following equation:

$$Rq = \sqrt{\frac{1}{N} \sum_{n=1}^{N} (Zn)^2}$$

Where Zn is, for each point, the algebraic difference Z relative to the mean line calculated during filtering.

The surface of the lens substrate can be a naked surface, i.e. a surface free of any deposited coating layer, or it can be a surface already covered with one or more functional coating layers, in particular a primer coating layer.

Although the lens substrate can be made of mineral glass or organic glass, it is preferably made of organic glass. The organic glass can be either thermoplastic materials such as polycarbonates and thermoplastic polyurethanes or thermosetting (cross-linked) materials such as diethylene glycol bis (allylcarbonate) polymers and copolymers (in particular CR 39® from PPG Industries), thermosetting polyurethanes, polythiourethanes, polyepoxides, polyepisulfides, poly (meth)acrylates, polythio(meth)acrylates, as well as copolymers thereof and blends thereof. Preferred materials for the lens substrate are polycarbonates and diethylene glycol bis (allylcarbonate)copolymers, in particular substrates made of polycarbonate.

The geometrically defined surface of the lens substrate to be coated is preferably pretreated to promote adhesion of the transparent adhesive composition layer. Any physical or chemical adhesion promoting pretreatment step can be used such as a solvent treatment, a NaOH treatment or a corona discharge treatment. Preferably the geometrically defined surface of the lens substrate to be coated is pretreated by corona discharge.

The layer of transparent adhesive composition is either formed on the coating or stack of coatings borne by the carrier, or on the geometrically defined surface of the lens substrate on which the coatings are transferred, preferably on the coating or stack of coatings of the carrier.

An important feature of the process of the invention is that the layer of a transparent adhesive composition is brought to a state at which the layer becomes unflowable under the process conditions, if it is not already in such an unflowable state at the end of deposition step (c). This means that, at least before moving step (e) and pressing step (f), the transparent adhesive composition layer, if necessary, has been pre-cured or dried to a hardened state such that the layer will not be significantly spreadable, in particular under the pressing and optional heating steps of the invention process. Although the thickness of the transparent adhesive composition layer in the (final) recovered coated lens substrate may be very slightly different from the thickness of the dry transparent adhesive composition layer as initially deposited on the functional coating or the geometrically defined surface of the lens substrate, the hardened (unflowable) state of the adhesive layer is such that the layer, when pressed and optionally heated during the process, cannot flow over the lens substrate surface.

Another important feature is that there is a direct contact between the layer of transparent adhesive composition and the surface that will come into contact with the adhesive layer. In particular, there is no liquid layer, especially no water based liquid between the layer of transparent adhesive composition and the surface that will come into contact with the adhesive layer.

In a preferred embodiment, the process of the invention provides a recovered coated lens substrate, in which the layer of transparent adhesive composition is of uniform thickness. By uniform thickness, it is meant a substantially constant thickness over the entire layer area, such that variation of thickness of the layer has no consequence on the optical power of the final lens.

More precisely, thickness of a layer can be considered as uniform, when the thickness difference between the maximum thickness and the minimum thickness of the layer is not more than 2.0 µm, preferably not more than 1.0 µm and more preferably not more than 0.65 µm whatever the lens curve is spheric, toric or has a progressive shape. Thanks to the evenly pre-applied layer of adhesive, the risk of optical distortion induced by the coating transfer process is greatly reduced. Thus, it is possible to transfer coatings on all kind of optical power lenses including lenses having a progressive surface with a very precise optical quality.

Generally, the thickness of the layer of the transparent adhesive composition ranges from 0.5 to 20 µm, preferably 1 to 20 µm, more preferably 1 to 5 µm and even better 1 to 3 µm once brought to a state at which the layer becomes unflowable under the process conditions. Deposition of the transparent adhesive composition layer can be performed by any of the techniques known in the art, such as dip coating, flow coating, spin coating or dry transfer, preferably spin coating. The transparent adhesive composition can be of any kind, provided that it can be applied by the above coating methods and brought to a state at which the layer becomes unflowable under the process conditions. The transparent adhesive composition is preferably selected from the group consisting of pressure-sensitive adhesives (PSA) and hot-melt adhesives (HMA).

By "pressure-sensitive adhesive" (or sometimes "self-adhesive material"), it is meant a distinct category of adhesives. PSAs are aggressively and permanently tacky in dry form (solvent-free) at room temperature or at temperature of use. They are characterized by their ability to firmly adhere to a variety of dissimilar surfaces under a slight pressure by forming Van der Waals bonds with said surfaces. In any case, no other external energy (such as temperature, solvent, UV . . . ) but pressure is compulsory to form the adhesive joint. However, other external energy may be used to enhance the adhesive performance. Another requirement is that PSAs should have a sufficient cohesive strength to be removed by peeling without leaving residues to said surfaces. PSAs are available into three forms: solvent borne, water borne (latex) and the form obtained by hot melt process. The dry and unflowable PSA layers according to the invention may be formed by evenly applying a liquid form or by transferring a dry layer previously formed on either a geometrically defined surface of the lens substrate or a functional coating. Thereafter, if liquid, the deposited layer is dried to an unflowable state by heating. Usually, heating will be performed at a temperature ranging from 40° C. to 130° C.

By "hot-melt adhesive", it is intended to mean a room temperature solid but flexible adhesive, which melts or drops in viscosity upon heating, and rapidly sets with cooling to create a bond. Preferably, the HMA used in the present invention will not be flowable even after heating of step g) because it is laminated firstly in very tight conditions. So the variation of thickness of the adhesive layer in the final lens, when coatings are transferred, will typically be less than 2 microns.

HMAs can be repeatedly softened by heat and hardened or set by cooling (thermoplastic HMAs), except for reactive HMAs, which are applied like conventional HMAs but crosslink forming permanent, non-remelting bonds. Additives such as siloxanes or water can be used to form the crosslinked bonds. An important property of HMAs is the ability to solidify or congeal or "set" very rapidly under normal ambient conditions, preferably almost instantaneously, when cooling down from the application temperature. They are available in dry form, or in solvent and latex based forms. The dry and unflowable layers according to the invention may be formed by evenly applying a liquid form on either a geometrically defined surface of the lens substrate or a functional coating. Thereafter, the deposited liquid latex layer is dried to an unflowable state by heating. Usually, heating will be performed at a temperature ranging from 40° C. to 130° C. When a dry form is used, it is heated to the temperature where it will flow readily, and then it is applied to either a geometrically defined surface of the lens substrate or a functional coating. It can also be extruded into place by using a hot-melt extruder or die face.

Step (g), consists in applying heat during pressing step (f). Applied heat preferably ranges from 50 to 120° C. ("tacky temperature"). Heating condition and time are very important to obtain a good adhesion in the case of HMAs.

As is known in the art, if a polymer or polymer blend does not have the properties of a PSA or a HMA per se within the meaning of these terms as used herein, it can function as a PSA or a HMA by admixture with small quantities of additives. In some embodiments, the transparent adhesive composition of the invention may comprise, apart from the polymer material, tackifiers, preferably tackifier resins, plasticizers, diluents, waxes, liquid oils and various other components for adjusting the tack, rheology characteristics (including viscosity, thixotropy, and the like), adhesive bond strength characteristics, rate of "set", low temperature flexibility, color, odor, etc. Such plasticizers or tackifying agents are preferably compatible with the blend of polymers, and include: aliphatic hydrocarbons, mixed aliphatic and aromatic hydrocarbons, aromatic hydrocarbons, hydrogenated esters and polyterpenes.

In a preferred embodiment, the transparent adhesive composition may also include an effective amount of a coupling agent (as defined hereinafter) in order to promote its adhesion with the geometrically defined surface of the lens substrate and/or the functional coating to be transferred, in particular an abrasion and/or scratch-resistant coating layer. The transparent adhesive composition may also comprise a classical dye or a photochromic dye.

The families of PSAs are classified according to the main elastomer used in the adhesive formulation. The main families are: natural rubber based PSAs, polyacrylates based PSAs (such as polyethylhexyl acrylate, poly n-butyl acrylate), styrenic block copolymers based PSAs [such as Styrene-Isoprene (SI), Styrene-Isoprene-Styrene (SIS), Styrene-Butadiene (SB), Styrene-Butadiene-Styrene (SBS)], and mixtures thereof. Styrene-butadiene random copolymers, butyl rubber, polyisobutylene, silicon polymers, synthetic polyisoprene, polyurethanes, polyvinyl ethyl ethers, polyvinyl pyrrolidone, and mixtures thereof, may also be used as bases for PSA formulations. For examples, see Sobieski et al., *Handbook of Pressure-Sensitive Adhesive Technology, 2nd ed.*, pp. 508-517 (D. Satas, ed.), Van Nostrand Reinhold, New York (1989), incorporated by reference in its entirety.

The PSAs used in this invention are preferably selected from polyacrylate based PSAs and styrenic block copolymers based PSAs.

Examples of polymers, which can be used for formulating HMAs are solvent-free polyamides, polyethylene, polypropylene and other olefin-type polymers, polyurethanes, polyvinyl pyrrolidones, polyesters, poly(meth)acrylic systems, other copolymers thereof, and mixtures thereof. The hot-melt adhesives according to the invention are preferably selected from dry poly(meth)acrylic latexes, such as the acrylic latex commercialized under the name Acrylic latex A-639 by Zeneca, dry polyurethane latexes, such as the latexes commercialized under the names W-240 and W-234 by Baxenden, dry polyester latexes and mixtures thereof. Preferred latexes are polyurethane latexes. Other preferred latexes are core/shell latexes such as those described in U.S. Pat. No. 6,503,631 to Essilor and especially latexes based on alkyl(meth)acrylates such as butyl acrylate or butyl methacrylate.

The carrier, which bears the coating layers to be transferred, is a rigid or flexible carrier, preferably a flexible carrier. The flexible carrier is a removable carrier, i.e. a carrier that is intended to be removed at the end of the coating transfer process, so that only the coating or stack of coatings are transferred to the geometrically defined surface of the lens substrate after completion of the process. Preferred flexible carrier may be a thin supporting element made of a plastic material especially a thermoplastic material. Examples of thermoplastic (co)polymers, which can be used for making the carrier are polysulfones, aliphatic poly(meth)acrylates, such as methyl poly(meth)acrylate, polyethylene, polypropylene, polystyrene, SBM (styrene-butadiene-methyl methacrylate) block copolymers, polyphenylene sulfide, arylene polyoxides, polyimides, polyesters, polycarbonates such as bisphenol A polycarbonate, PVC, polyamides such as the nylons, other copolymers thereof, and mixtures thereof. The preferred thermoplastic material is polycarbonate. Such a removable flexible carrier generally has a thickness of 0.2 to 5 mm, preferably from 0.5 to 2 mm.

Usual functional coatings, as is well known, comprise anti-fouling top coats, anti-reflection coatings, anti-abrasion- and/or scratch-resistant coatings, impact-resistant coatings, polarized coatings, photochromic coatings, dyed coatings, printed layers, microstructured layers. Preferably, functional coatings used in the present invention are selected from the group consisting of an anti-fouling top coat, an anti-reflection coating, an abrasion- and/or scratch-resistant coating and an impact-resistant coating. Generally, the main surface of the carrier bears a stack of several functional coating layers. Ideally, said stack of several functional coatings comprises, starting from the carrier main surface an anti-fouling top coat layer, an anti-reflection coating (AR coating) layer, an abrasion- and/or scratch-resistant coating (hardcoat) layer and optionally an impact-resistant primer coating layer, these layers being deposited in this indicated order (reverse from the final order on the optical article). It is worth noting that the transparent adhesive composition layer may advantageously act as an impact-resistant primer coating. Then, it preferably fulfills the preferred requirements of impact resistant primer coatings, such as a Tg of less than 30° C., as described hereinafter.

It is also worth noting, that the coating or the outermost coating of the coating stack may be coated with a protecting and releasing coating, which acts to protect it and has to be removed before implementing the process of the invention.

The anti-fouling top coat, which in the finished optical article constitutes the outermost coating on the lens substrate, is intended for improving dirty mark resistance of the finished optical article and in particular of the anti-reflection coating.

As known in the art, an anti-fouling top coat is a layer wherein the stationary contact angle to deionized water is at least 60°, preferably at least 75° and more preferably at least 90°, and even better more than 100°. The stationary contact angle is determined according to the liquid drop method in which a water drop having a diameter smaller than 2 mm is formed on the optical article and the contact angle is measured.

The anti-fouling top coats preferably used in this invention are those which have a surface energy of less than 14 m Joules/m$^2$. The invention has a particular interest when using anti-fouling top coats having a surface energy of less than 13 m Joules/m$^2$ and even better less than 12 m Joules/m$^2$.

The surface energy values referred just above are calculated according to Owens Wendt method described in the following document: Owens, D. K.; Wendt, R. G. "Estimation of the surface force energy of polymers", *J. Appl. Polym. Sci.* 1969, 51, 1741-1747.

Such anti-fouling top coats are well known in the art and are usually made of fluorosilicones or fluorosilazanes i.e. silicones or silazanes bearing fluorine-containing groups, which are both hydrophobic and oleophobic. Example of a preferred anti-fouling top coat material is the product commercialized by Shin Etsu under the name KP 801M.

The top coat may be deposited onto the carrier using any typical deposition process, but preferably using thermal evaporation technique.

Thickness of the anti-fouling top coat usually ranges from 1 to 30 nm, preferably 1 to 15 nm, more preferably 1 to 5 nm.

Anti-reflection coatings and their methods of making are well known in the art. The anti-reflection can be any layer or stack of layers which improves the anti-reflective properties of the finished optical article. The anti-reflection coating may preferably consist of a mono- or multilayer film of dielectric materials such as SiO, $SiO_2Si_3N_4$, $TiO_2$, $ZrO_2$, $Al_2O_3$, $MgF_2$ or $Ta_2O_5$, or mixtures thereof.

The anti-reflection coating can be applied in particular by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

The anti-reflection coating can be applied by applying liquid solutions, preferably by a spin coating process.

In case where the anti-reflection coating includes a single layer, its optical thickness must be equal to $\lambda/4$, where $\lambda$ is a wavelength of 450 to 650 nm. Preferably, the anti-reflection coating is a multilayer film comprising three or more dielectric material layers of alternatively high and low refractive indexes.

Of course, the dielectric layers of the multilayer anti-reflection coating are deposited on the carrier or the anti-fouling top coat in the reverse order they should be present on the finished optical article.

A preferred anti-reflection coating may comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

Preferably, after deposition of the four-layer anti-reflection stack, a thin layer of $SiO_2$ of 1 to 50 nm thick (physical thickness) may be deposited. This layer promotes the adhesion between the anti-reflection stack and the abrasion- and/or scratch-resistant coating generally subsequently deposited, and is not optically active.

The next layer to be deposited is the abrasion- and/or scratch-resistant coating. Any known optical abrasion- and/or scratch-resistant coating composition can be used to form the abrasion- and/or scratch-resistant coating. Thus, the abrasion- and/or scratch-resistant coating composition can be a UV and/or a thermal curable composition.

By definition, an abrasion- and/or scratch-resistant coating is a coating which improves the abrasion- and/or scratch-resistance of the finished optical article as compared to a same optical article but without the abrasion- and/or scratch-resistant coating.

Preferred abrasion- and/or scratch-resistant coatings are those made by curing a precursor composition including epoxyalkoxysilanes or a hydrolyzate thereof, optionally colloidal mineral fillers and a curing catalyst. Examples of such compositions are disclosed in U.S. Pat. No. 4,211,823, WO Pat. No. 94/10230, U.S. Pat. No. 5,015,523, EP Pat. No. 614957.

The most preferred abrasion- and/or scratch-resistant coating compositions are those comprising as the main constituents an epoxyalkoxysilane such as, for example, γ-glycidoxypropyl-trimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the abrasion- and/or scratch-resistant coating to the impact-resistant primer coating to be subsequently deposited or to the transparent adhesive composition layer, an effective amount of at least one coupling agent can be added to the abrasion- and/or scratch-resistant coating composition. The preferred coupling agent is a pre-condensed solution of an epoxyalkoxysilane and an unsaturated alkoxysilane, preferably comprising a terminal ethylenic double bond.

Examples of epoxyalkoxysilanes are GLYMO, γ-glycidoxypropyl-pentamethyldisiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis(trimethylsiloxy)methylsilane. The preferred epoxyalkoxysilane is GLYMO.

The unsaturated alkoxysilane can be a vinylsilane, an allylsilane, an acrylic silane or a methacrylic silane.

Examples of vinylsilanes are vinyltris(2-methoxyethoxy)silane, vinyltrisisobutoxysilane, vinyltri-tert-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxy-silane, vinylbis(trimethylsiloxy)silane and vinyldimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris(trimethylsiloxy)silane, 3-acryloxy-propyl-trimethoxysilane, acryloxy-propylmethyl-dimethoxysilane, 3-acryloxypropyl-methylbis(trimethylsiloxy)silane, 3-acryloxypropyl-dimethylmethoxysilane, N-(3-acryloxy-2-hydroxypropyl)-3-aminopropyl-triethoxysilane.

Examples of methacrylic silanes are 3-methacryloxypropyltris(vinyldimethoxylsiloxy)silane, 3-methacryloxypropyltris(trimethylsiloxy)silane, 3-methacryloxypropyltris(methoxyethoxy)silane, 3-methacryloxy-propyl-trimethoxysilane, 3-methacryloxypropyl-pentamethyl-disiloxane, 3-methacryloxy-propyl-methyldimethoxysilane, 3-methacryloxy-propylmethyl-diethoxysilane, 3-methacryloxypropyl-dimethyl-methoxysilane, 3-methacryloxy-propyl-dimethylethoxysilane, 3-methacryloxy-propenyl-trimethoxy-silane and 3-methacryloxy-propylbis(trimethylsiloxy)methylsilane.

The preferred silane is acryloxypropyl-trimethoxysilane.

Preferably, the amounts of epoxyalkoxysilane(s) and unsaturated alkoxysilane(s) used for the coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight. The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_kSiO_{(4-k)/2}$ where Q is the organic group that bears the epoxy or unsaturated group and $Q_kSiO_{(4-k)/2}$ comes from $Q_kSiR'O_{(4-k)}$ where Si—R' reacts to form Si—OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprise:

1) mixing the alkoxysilanes
2) hydrolysing the alkoxysilanes, preferably by addition of an acid, such a hydrochloric acid
3) stirring the mixture
4) optionally adding an organic solvent
5) adding one or several catalyst(s) such as aluminum acetylacetonate
6) Stirring (typical duration: overnight).

Typically, the amount of coupling agent introduced in the scratch-resistant coating composition represents 0.1 to 15% by weight of the total composition weight, preferably 1 to 10% by weight.

The abrasion- and/or scratch-resistant coating composition can be applied on the anti-reflection coating using any classical method such as spin, dip or flow coating.

The abrasion- and/or scratch-resistant coating composition can be simply dried or optionally pre-cured before application of the subsequent impact-resistant primer coating layer (which may be the transparent adhesive composition layer) or implementation of the process of the invention. Depending upon the nature of the abrasion- and/or scratch-resistant coating composition, thermal curing, UV-curing or a combination of both can be used.

Thickness of the abrasion- and/or scratch-resistant coating, after curing, usually ranges from 1 to 15 μm, preferably from 2 to 6 μm, preferably from 3 to 5 microns.

Before applying the impact resistant primer on the scratch-resistant coating, it is possible to subject the surface of the scratch-resistant coating to a corona treatment or a vacuum plasma treatment, in order to increase adhesion.

The impact-resistant primer coating can be any coating typically used for improving impact resistance of a finished optical article. Also, this coating generally enhances adhesion of the scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings.

(Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden.

In a preferred embodiment, the impact-resistant primer coating may also include an effective amount of a coupling agent in order to promote adhesion of the primer coating to the optical substrate and/or to the scratch-resistant coating. The same coupling agents, in the same amounts, as for the scratch-resistant coating compositions, can be used with the impact-resistant coating compositions.

The impact-resistant primer coating composition can be applied on the scratch-resistant coating using any classical method such as spin, dip, or flow coating.

The impact-resistant primer coating composition can be simply dried or optionally pre-cured before molding of the optical substrate. Depending upon the nature of the impact-resistant primer coating composition, thermal curing, UV-curing or a combination of both can be used.

Thickness of the impact-resistant primer coating, after curing, typically ranges from 0.05 to 30 μm, preferably 0.5 to 20 μm and more particularly from 0.6 to 15 μm, and even better 0.6 to 5 μm.

Given that the flexible carrier of the functional coating layers is intended to be withdrawn at the completion of the process, it may be first coated with a layer of release agent, which may optionally be removed at the end of the process of the invention. In one embodiment, the anti-fouling top coat defined above advantageously acts as a non-removable release agent layer.

The force applied in pressing step (f) of the inventive process can be obtained by applying pressure, in particular air pressure, or vacuum to the carrier. The applied pressure will typically range from 0.35 to 4.2 bar (5 to 60 psi), preferably 0.35 to 3 bar and better 0.35 to 2.1 bar (5 to 30 psi). When vacuum is used for creating the application force, the typically applied force may be above 5 Newtons, preferably above 10 Newtons, more preferably above 15 Newtons. Air pressure may be applied using an inflatable membrane apparatus as disclosed in international patent application WO 03/004255. A general description of a vacuum structure allowing transferring the coatings can be found in U.S. Pat. No. 4,242,162.

In order to improve the conformation of the carrier to the surface of the lens substrate on which the coatings have to be transferred, especially if the transfer is implemented on the front face of the lens substrate, one can use an additional means to increase the pressure on the carrier. Typically, one can use a pad, optionally deformable, which can conform to the general shape of the carrier and increase the pressure applied to the carrier.

Figure 1B:
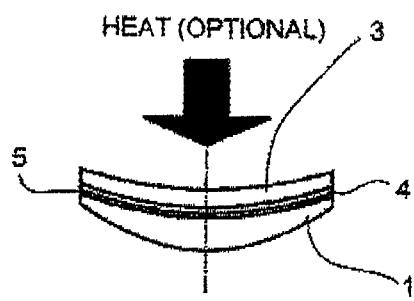
Figure 1C:
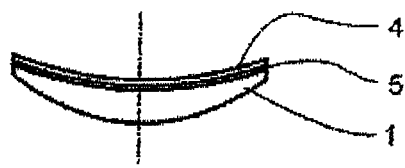

Referring now to the drawings and in particular to FIGS. 1A to 1C, a lens substrate 1 having a concave surface 2 is placed on a supporting element (not represented) with its concave (rear) surface 2 facing upwardly. A flexible carrier 3, a main surface of which has been previously coated with at least one functional coating 4 and a layer of a transparent adhesive composition 5 according to the invention, brought to a state at which the layer becomes unflowable under the process conditions, is placed onto a supporting element (not represented) with the transparent adhesive composition layer facing downwardly.

Deposition of the at least one functional coating 4 and transparent adhesive composition layer 5 on the surface of the flexible carrier 3 can be done through any usual deposition process employed in the optical field, such as vacuum deposition, spin coating, flow coating, dip coating etc. . . . . Of course, the deposition process will depend on the nature of the coating layer or layers and of the transparent adhesive composition layer deposited on the surface of the flexible carrier 3.

Thereafter, the supporting elements are moved relatively to each other to bring into direct contact transparent adhesive composition layer 5 and the surface of the lens substrate 2, which are then pressed together in such a manner that the exerted pressure shall be insufficient to impart any deformation to the lens substrate 1. Heat is applied during pressing step (f) if the transparent adhesive composition is selected from the group consisting of hot-melt adhesives (HMA) compositions. In general, if the transparent adhesive composition is selected from the group consisting of pressure-sensitive adhesive compositions, no heat is applied during pressing step (f), although heat may be used if desired.

The heating source in that particular case of the present invention could be an air oven with temperature from 70 to 120° C., or a hot water bath from 70° C. to 100° C., IR heat source or microwave source. Heating time could be from few minutes to 30 minutes, for example heat is applied for 3 to 30 minutes.

As shown in FIG. 1B, the assembly formed by the lens substrate 1, the transparent adhesive composition layer 5, the at least one functional coating 4, and the flexible carrier 3 is then placed in the particular case of HMA into a device for heating. After this optional heating step, the pressure is released, the flexible carrier 3 is withdrawn and the lens substrate 1 having at least one functional coating 4 adhering to its concave surface 2 through the layer of transparent adhesive composition 5 is recovered as shown in FIG. 1C.

Figure 2A:
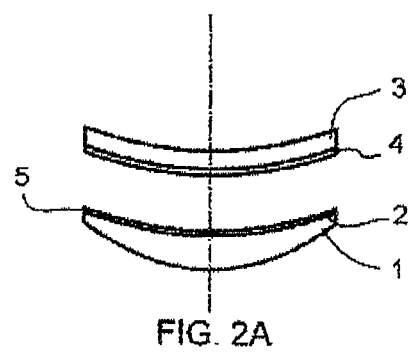
FIGS. 2A to 2C, are schematic views of the main steps of a second embodiment of the process of the invention wherein the layer of a transparent adhesive composition is deposited on at least one geometrically defined surface of the lens substrate.
Figure 2B:
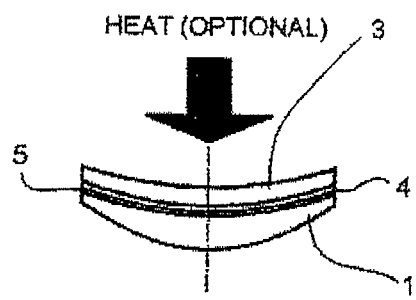
Figure 2C:
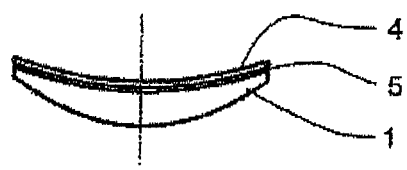

FIGS. 2A to 2C represent the main steps of a similar process as disclosed in connection with FIGS. 1A to 1C except that the transparent adhesive composition layer 5 is formed on the concave (rear) surface 2 of the lens substrate 1.

The following examples illustrate the present invention.

EXAMPLES

General Considerations

In examples 1 to 3, the carrier is a polycarbonate (PC) carrier (Spherical: 5.80 base) bearing on its convex surface a coating stack including, starting from the carrier, an anti-fouling top coat, an anti-reflection coating and an abrasion and/or scratch-resistant coating. A transparent adhesive composition layer also acting as an impact resistant primer composition is formed on the abrasion- and/or scratch-resistant coating. The assembly of the coating stack and the transparent adhesive composition layer is called the "HMC coating".

The PC carrier bearing the HMC coating is called the "HMC carrier".

Step 1: Deposition of a Protecting and Releasing Coating

The composition of the protecting and releasing coating is as follows:

TABLE 1

| Component | Parts by weight |
|---|---|
| PETA LQ (acrylic ester of pentaerythritol) | 5.00 |
| Dowanol PnP | 5.00 |
| Dowanol PM | 5.00 |

TABLE 1-continued

| Component | Parts by weight |
|---|---|
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

This protecting and releasing coating will not be transferred and will stay on the carrier after transferring the HMC coating.

Step 2: Deposition of an Anti-Fouling Top Coat and Anti-Reflection (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the carrier:

1. The carrier having the protective coating already applied on the surface is loaded into a standard box coater and the chamber is pumped to a high vacuum level.

2. Anti-fouling coating (Chemical=Shin Etsu KP 801M) is deposited onto the surface of the carrier using a thermal evaporation technique, to a thickness in the range of 2-15 nm.

3. The dielectric multilayer AR coating, consisting of a stack of sub-layers of high and low refractive index materials is then deposited, in reverse of the normal order. Details of this deposition are as such:

The optical thicknesses of the alternating low and high refractive index layers are presented in the table (They are deposited in the indicated order, from the carrier surface):

TABLE 2

| Low index | 103-162 nm |
|---|---|
| High index | 124-190 nm |
| Low index | 19-37 nm |
| High index | 37-74 nm |

A preferred stack, which is deposited in the examples, is a stack wherein the low index material is $SiO_2$ and the high index material is $ZrO_2$.

B/ At the completion of the deposition of the four-layer anti-reflection stack, a thin layer of $SiO_2$, comprising of a physical thickness of 1-50 nm, is deposited. This layer is intended to promote adhesion between the oxide anti-reflection stack and a lacquer hard-coating which will be deposited on the coated carrier at a later time.

Step 3: Deposition of a Hard Coat (HC) & Latex Primer Coating

The composition of the hard coating is as follows:

TABLE 3

| Component | Parts by weight |
|---|---|
| GLYMO | 21.42 |
| 0.1N HCl | 4.89 |
| Colloidal silica | 30.50 |

TABLE 3-continued

| Component | Parts by weight |
|---|---|
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the adhesive and impact resistant primer coating is as follows:

TABLE 4

| Component | Parts by weight |
|---|---|
| Polyurethane latex W-234 | 35.0 |
| Deionized water | 50.0 |
| 2-Butoxy ethanol | 15.0 |
| Coupling agent | 5.0 |

This primer coating composition is used as a hot melt adhesive composition in the following examples.

The PC carrier after deposition of protecting coating, antifouling coating, and AR coating in steps 1 and 2 is then spin coated by a HC solution at 600 rpm/1200 rpm, and pre-cured 10 minutes at 80° C., and again spin coated by the adhesive and impact resistant primer composition solution at the same speed and post-cured for 1 hour at 80° C. (This provides a dry latex layer having a thickness of about 1.8 to 2 microns).

The coupling agent is a pre-condensed solution of:

TABLE 5

| Component | Parts by weight |
|---|---|
| GLYMO (Glycidoxypropyltrimethoxysilane) | 10.0 |
| Acryloxypropyl-trimethoxysilane | 10.0 |
| 0.1 N HCl | 0.5 |
| Aluminum acetylacetonate | 0.5 |
| Diacetone alcohol | 1.0 |

Testing and Inspection Procedures:

Dry adhesion is measured using the cross-hatch adhesion test according to ISTM 02010, using 3M SCOTCH® n° 600 transparent tape. 25 squares are formed. Adhesion is rated as follows:

TABLE 6

| Adhesion score | Squares removed | Area % left intact |
|---|---|---|
| 0 | 0 | 100 |
| 1 | <1 | 96 |
| 2 | 1 to 4 | 96-84 |
| 3 | >4 to 9 | 83-64 |
| 4 | >9 to 16 | 63-36 |
| 5 | >16 | <36 |

Wet adhesion test: same test method as dry adhesion test except the sample is boiling in hot water at 100° C. for 30 minutes before implementing the test.

Carrier Preparation:

0.5 mm PC carrier made by injection with 5.8 and 6.4 base are coated on their convex surface with HMC coating as disclosed above.

B&L Vertometer:

It is a lensometer made by Bausch & Lomb Co. The Vertometer is a centered optical system consisting of a light source, a movable, rotatable target, a standard lens, a telescope, means for holding a spectacle lens at the standard lens anterior principle focus, means for rotating and shifting target position, and a mechanical coaxial marking device. With a spectacle lens centered in position for measuring, the target is positioned to be imaged, by the standard lens, at the focus of the spectacle lens. In this position the target is imaged on the telescope reticle by the spectacle lens, and can be viewed through the telescope eyepiece. The B&L Vertometer enables to inspect lenses and identify lenses with or without any optical distortion or deformation.

Example 1

One uses the HMC carrier described above i.e. the PC carrier with the HMC coating comprising an impact resistant primer adhesive coating composition comprising a HMA polyurethane latex material (W-234, from Baxenden). This HMA latex becomes tacky when heated above 60° C. The tacky behavior can be repeated with heating and cooling.

Figure 3:
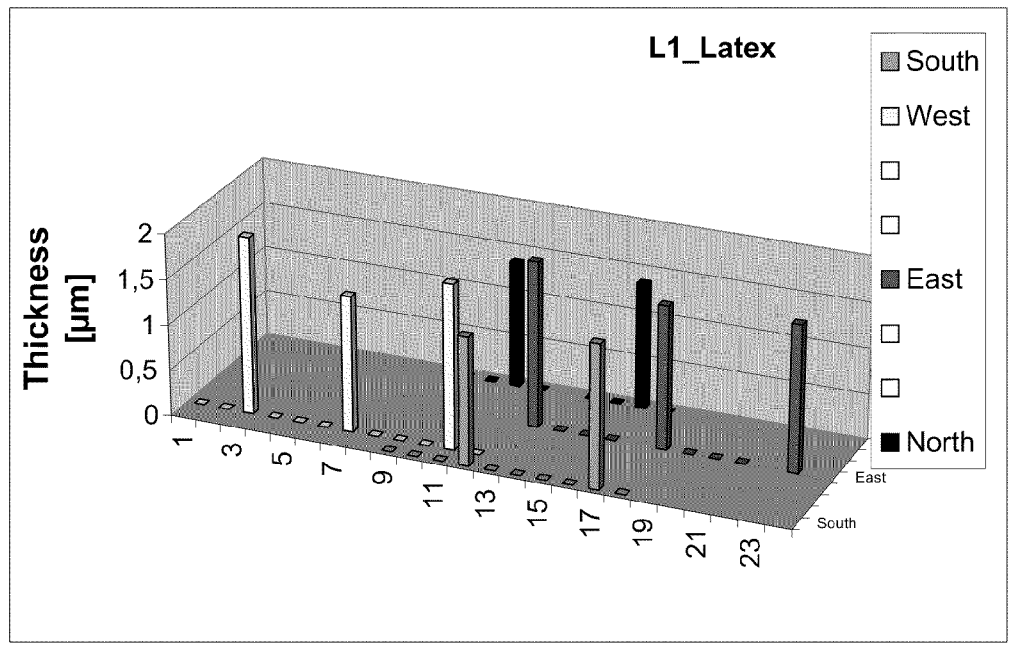
FIG. 3, is a map of thickness irregularities of a layer of a transparent adhesive composition in a lens substrate coated with a stack of functional coatings adhering to said lens substrate through said layer of transparent adhesive composition, which has been deposited on a carrier having a main surface bearing said stack of functional coatings, said coating stack having been transferred onto the surface of said lens substrate according to the process of the invention.
Figure 4:
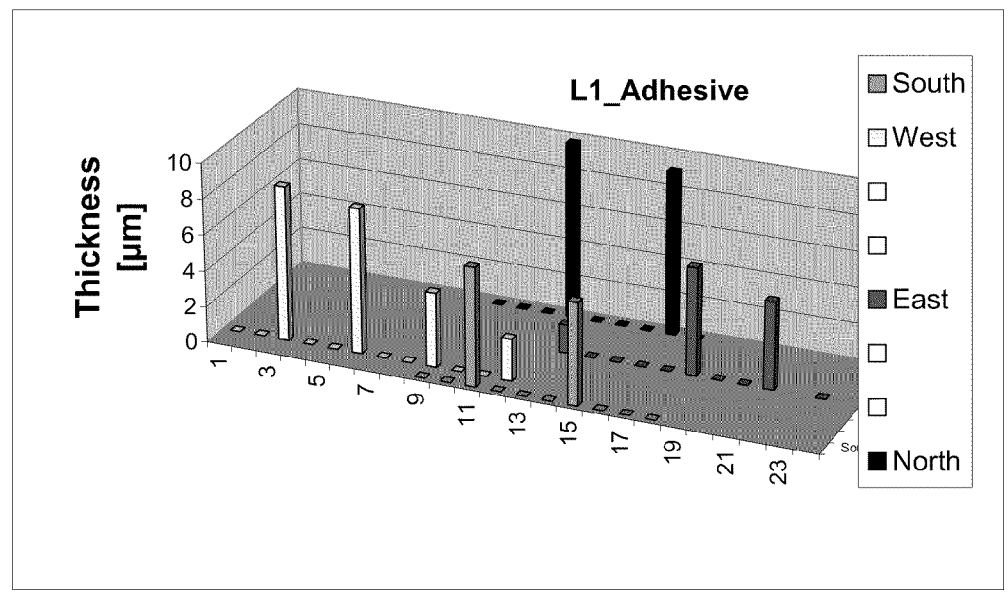
FIG. 4, is a map of thickness irregularities of a layer of adhesive in a lens substrate coated with a stack of functional coatings adhering to said lens substrate through said layer of adhesive, obtained from a liquid curable adhesive composition according to a prior art process.
Figure 5:
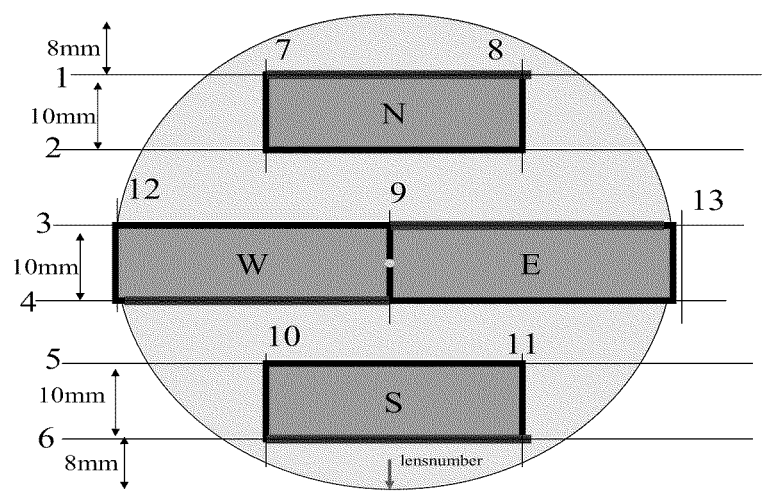
FIG. 5, is related to a method of thickness measurement of the layer of transparent adhesive composition according to the invention, when deposited on the surface of the entire lens substrate. This measurement method is used in example 1 and comparative example 1.

Then the HMC coating on the carrier was applied at room temperature to the back surface of a polycarbonate lens (−2.00, spherical, back curve 5.0) in the manner described in connection with FIGS. 1A to 1C: after applying an external air membrane pressure (12 psi-0.83 bar), the assembly of coated carrier and lens was heated at 110° C. for 20 minutes in air oven under the same pressure. Then it was cooled down and the carrier was removed with the HMC layer transferred to the lens surface. The transferred coating layer has very good adhesion on lens surface with a dry adhesion score of 0. There is no AR cracking during this transfer. The obtained lens was checked by B&L Vertometer and there was no any optical distortion or deformation. The maximum coating thickness of this polyurethane latex layer seen over the entire lens surface is 1.94 μm. The minimum coating thickness seen over the entire lens surface is 1.38 μm. FIG. 3 is a map of thickness irregularities of the HMA layer in the recovered lens substrate obtained in this example. As can be seen, thickness is essentially uniform over the whole lens surface. (The latex thickness of the sample was measured on the entire lens (east, west, north and south as shown in FIG. 5. In FIGS. 3 and 4, y axis is the thickness of the polyurethane latex layer in microns and x is the position of measurement on each part of the sample). Three lenses made in this process have the same good optical results, as seen by B&L Vertometer.

It was also checked that nearly the same HMA thickness is obtained when the layer is initially deposited by spin-coating and in the final product after the pressing step.

Comparative Example 1

Use of a Liquid Curable Adhesive Composition

The same procedure as example 1 was applied, except 5 drops (~0.15 g) of UV acrylic adhesive solution were used instead of a HMA according to the invention. Then, the same assembly of carrier and lens was UV cured for 40 seconds. After that, the carrier was removed with the HMC layer transferred to the lens surface. The obtained lens has the same coating performance as example 1. Its power range is within the Z80.1 standard (+/−0.13 Diopt). However, after checked with B&L Vertometer, the lens was seen some optical distortion or optical deformation, which is due to the uneven liquid adhesive layer on the backside of the lens. The maximum coating thickness of this acrylic adhesive layer seen over the entire lens surface is 9.80 μm. The minimum coating thickness seen over the entire lens surface is 1.57 μm. FIG. 4 is a map of thickness irregularities of the adhesive layer in the recovered lens substrate obtained in this example. As can be seen, there are some areas of the lens where there is more thickness irregularities. Three lenses made in this process have the same few optical distortion/wave seen in B&L Vertometer.

This comparative example shows that a better optical quality is obtained when using the transfer process according to the invention, rather than the traditional liquid glue process. The process of the invention delivers a coated lens substrate in which the coating adheres to the lens substrate surface through an adhesive layer of uniform thickness (1.4 to 1.9 µm, example 1). The traditional liquid glue process is inferior in terms of thickness uniformity (thickness range: 1.6 to 9.8 µm, comparative example 1). The present coating transfer process is greatly simplified when compared to the traditional one, since no liquid adhesive is involved and there is no need to worry about adhesive distribution, amount of the adhesive used and the viscosity of the adhesive. Moreover, neither an expensive adhesive dispensing device nor an UV curing system is required.

HMA, PSA can be applied in advance by spin coating with a very precise thickness. Adhesive thickness is not affected by lamination conditions as in the previous art, such as pressure, adhesive amount, adhesive dispense, viscosity of the adhesive, lens and carrier curve, etc: the adhesive thickness in this invention can be controlled very well in the entire lens surface whatever the lens curve or carrier curve. On the contrary, adhesive thickness is affected by the carrier base and lens curve when using a liquid glue process, since this process requires most often a mismatch of carrier vs. lens back curve. This means that the carrier base is higher than the lens base so that the liquid glue can be spread out during the carrier deformation during the pressing step. A different carrier base causes a different spreading pressure or pattern against the liquid glue when the applied pressure is kept constant. As a result, the glue thickness will be slightly different for each type of lens power.

Example 2

Same procedure as example 1, except a UV cross-linkable PSA formulation was used. PSA #US02008, Rahn Inc. was diluted in MEK (30/70 w/w) and spin-coated onto an HMC carrier (5.80 base). The resulting layer was then exposed to UV radiation for 30 seconds in an inert atmosphere. After exposure, the layer was dry, yet tacky to the touch. The HMC coating on the carrier was then transferred to the back surface of a polycarbonate lens (−2.00 D, back curve 5.0) in the manner described in connection with FIGS. 1A to 1C. An external air pressure (14 psi-0.98 bar) was applied for 30 seconds to the carrier/lens assembly, without UV or heat. After releasing the pressure, the carrier was removed from the back of the lens, with the coating stack and PSA layer remaining on the lens.

Example 3

2.1 g of Escorez 5380 resin from Exxon Mobil and 0.9 g of Vector 4100 block copolymer were added to 20 g of toluene and stirred until both had completely dissolved. This was the starting PSA solution and it contained 13% solids. Then it was prepared by diluting 5 g of starting solution with 5 g of toluene, resulting in a solution with 6.5% solids to get a final PSA solution. After that, it was spin coated onto the convex surface of a 5.8 base HMC pre-coated carrier at the following spin coating conditions:
Spin Coating Parameters
Slow speed: 500 rpm for 2 seconds
Fast speed: 2000 rpm for 5 seconds After PSA coating of the PSA layer, the carrier was allowed to air dry until the odor of toluene was no longer detectable. The convex side of the carrier was then placed onto the concave side of a −2.00 D polycarbonate lens with the back curve of 5.0 base, and subjected to the BST lamination process using the same procedure as example 1 except that the applied pressure is 16 psi for the membrane pressure, 1 minute holding time at that pressure and no heat is applied. After removal of the carrier, the HMC stack was transferred to the backside of the lens. There is no AR cracking during this transfer. The obtained lens has very good optics and there is no any optical distortion seen in B&L Vertometer.

Example 4

To simulate the adhesive thicknesses that would be observed using a transfer process under vacuum, several ORMA® lenses were coated with the W-234 latex (HMA), heated, and their surfaces were then pressed with a polyolefin film (without coatings) using the vacuum module described in U.S. Pat. No. 4,242,162.

The latex coated lenses were heated to 90° C. and the pressure applied was 10 psi.

The thickness of the latex coating was studied in detail over the lens and was measured optically by the SMR instrument.

Tables 7-9 show latex thickness measurements (in µm) at four locations before and after the pressing step with the polyolefin film. These tables reveal uniform thickness at said four points across the lens surface and minimal thickness change after the simulated transfer process, whatever the spin-coating rate. Remarkably, similar results are obtained in the center and in the periphery of the lens.

TABLE 7

| | Spin-coating at 500 rpm. | | | | | | | |
|---|---|---|---|---|---|---|---|---|
| | 0 deg | | 90 deg | | 180 deg | | 270 deg | |
| | before | after | before | after | before | after | before | after |
| 1 | 1.32 | 1.24 | 1.16 | 1.13 | 1.07 | 1.06 | 1.13 | 1.13 |
| 2 | 1.17 | 1.32 | 1.12 | 1.09 | 1.18 | 1.15 | 1.24 | 1.23 |
| 3 | 1.15 | 1.12 | 1.17 | 1.15 | 1.17 | 1.15 | 1.15 | 1.14 |
| 4 | 1.12 | 1.12 | 1.15 | 1.17 | 1.15 | 1.16 | 1.11 | 1.11 |
| 5 | 1.14 | 1.15 | 1.11 | 1.11 | 1.24 | 1.26 | 1.24 | 1.22 |
| Average | 1.18 | 1.19 | 1.142 | 1.13 | 1.162 | 1.156 | 1.174 | 1.166 |
| Standard deviation | 0.0803119 | 0.0877496 | 0.0258844 | 0.0316228 | 0.0614003 | 0.0709225 | 0.061887 | 0.0550454 |

TABLE 8

Spin-coating at 750 rpm.

| | 0 deg | | 90 deg | | 180 deg | | 270 deg | |
|---|---|---|---|---|---|---|---|---|
| | before | after | before | after | before | after | before | after |
| 6 | 0.87 | 0.85 | 0.84 | 0.85 | 0.88 | 0.89 | 0.84 | 0.85 |
| 7 | 0.79 | 0.79 | 0.83 | 0.82 | 0.84 | 0.83 | 0.81 | 0.79 |
| 8 | 0.79 | 0.79 | 0.81 | 0.82 | 0.86 | 0.84 | 0.79 | 0.81 |
| 9 | 0.81 | 0.81 | 0.81 | 0.81 | 0.82 | 0.81 | 0.84 | 0.85 |
| 10 | 0.79 | 0.81 | 0.8 | 0.8 | 0.81 | 0.8 | 0.79 | 0.8 |
| Average | 0.81 | 0.81 | 0.818 | 0.82 | 0.842 | 0.834 | 0.814 | 0.82 |
| ST DEV | 0.034641 | 0.0244949 | 0.0164317 | 0.0187083 | 0.0286356 | 0.0350714 | 0.0250998 | 0.0282843 |

TABLE 9

Spin-coating at 1000 rpm.

| | 0 deg | | 90 deg | | 180 deg | | 270 deg | |
|---|---|---|---|---|---|---|---|---|
| | before | after | before | after | before | after | before | after |
| 11 | 0.63 | 0.63 | 0.63 | 0.61 | 0.63 | 0.64 | 0.65 | 0.68 |
| 12 | 0.64 | 0.65 | 0.64 | 0.64 | 0.63 | 0.63 | 0.63 | 0.65 |
| 13 | 0.61 | 0.6 | 0.6 | 0.61 | 0.63 | 0.61 | 0.63 | 0.64 |
| 14 | 0.63 | 0.5 | 0.63 | 0.63 | 0.62 | 0.59 | 0.64 | 0.63 |
| 15 | 0.63 | 0.65 | 0.64 | 0.65 | 0.65 | 0.65 | 0.68 | 0.67 |
| Average | 0.628 | 0.606 | 0.628 | 0.628 | 0.632 | 0.624 | 0.646 | 0.654 |
| ST DEV | 0.0109545 | 0.0626897 | 0.0164317 | 0.0178885 | 0.0109545 | 0.0240832 | 0.0207364 | 0.0207364 |

(ST DEV is the standard deviation).

Method of Thickness Measurement of the Entire Lens

Example 1 and Comparative Example 1

A) Sample Preparing:

The lens sample was cut in four small parts as shown in FIG. 5 and then it was blocked/fixed by an epoxy resin so that it could be seen easily under microscopy. It was placed in order NWES all CX sides pointing north. Take was cared to get them close together and parallel after pouring liquid epoxy around the sample piece such that it becomes a disc shape to be measured from a cross-section part. Epoxy pucks were marked on north side. The specimen was washed thoroughly after each polishing step.

B) Thickness Measuring with Light Microscope:

Nikon Optiphot 2 with brightfield and darkfield illumination, phase illumination. Objectives 5× 40× 60× 100× 150×, Q-imaging Micropublisher Cooled CCD Camera 3.3 MPix, Diagnostic imaging T60C coupler, various filters, Nomarski Prisms for differential interference color contrast microscopy. Polarizer and analyzer. Episcopic fluorescence attachment using high pressure Xenon or super high pressure mercury arc lamp.

Example 5

This example describes the use of a PSA wherein a PSA layer deposited on a supporting film (hereafter called "liner") is first transferred from this liner on the HMC stack of the carrier.

Then the HMC stack is transferred from the carrier onto the surface of the lens.

1) Preparation of a Supporting Element for the Carrier.

Figure 6:
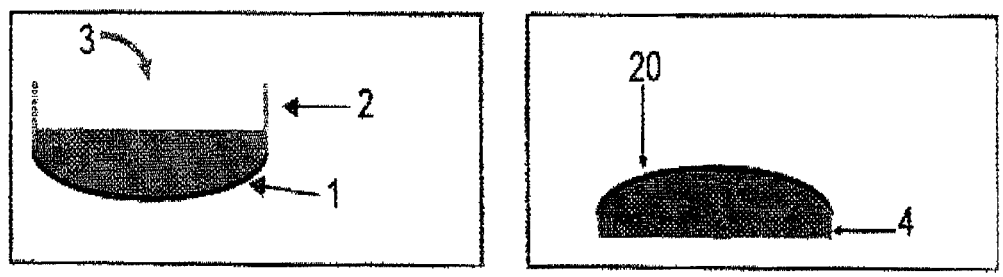
FIG. 6, schematically illustrates how to form a supporting element for application of a PSA layer on a coated carrier using a PSA coated liner.

Before all, a supporting element for the carrier during the PSA transfer process is casted according to the following procedure schematically represented in FIG. 6.

For this procedure, a first carrier 1 is used.

An annular wall 2 surrounding the carrier 1 is fixed at its periphery so that one creates a mould delimited at the bottom by the back concave side of the carrier 1 and on the edges by the annular wall 2 upwardly protruding from the periphery of the carrier.

A casting composition 3 comprising, as polymerising compound, Silguard® (a silicone composition including 10% by weight of polymerisation catalyst) is poured in the above described mould and polymerized by heating at 60° C. during 24 hours.

There is then obtained, after removing the carrier 1 and the annular wall 2, a convex supporting element 4 whose convex side is inversely replicating the back surface of the carrier 1.

This convex supporting element 4 will be used in the next step of this embodiment. It will prevent any deformation of the subsequent HMC coated carrier 20 (FIG. 7) during the transfer of the PSA layer.

2) PSA Transfer.

A 4.5 base HMC carrier 20 (diameter 74 mm) is provided having the HMC reverse stack on its convex front side.

Compressed air is blown at the surface of the HMC stack.

The HMC carrier 20 is placed on the supporting element 4, formed as described above, with its back concave side resting on the front convex side of the supporting element 4 which, as said previously, inversely replicates the back side of the carrier 20, so that no deformation of the carrier will happen when pressure is applied on the front convex side of the carrier.

Figure 7:
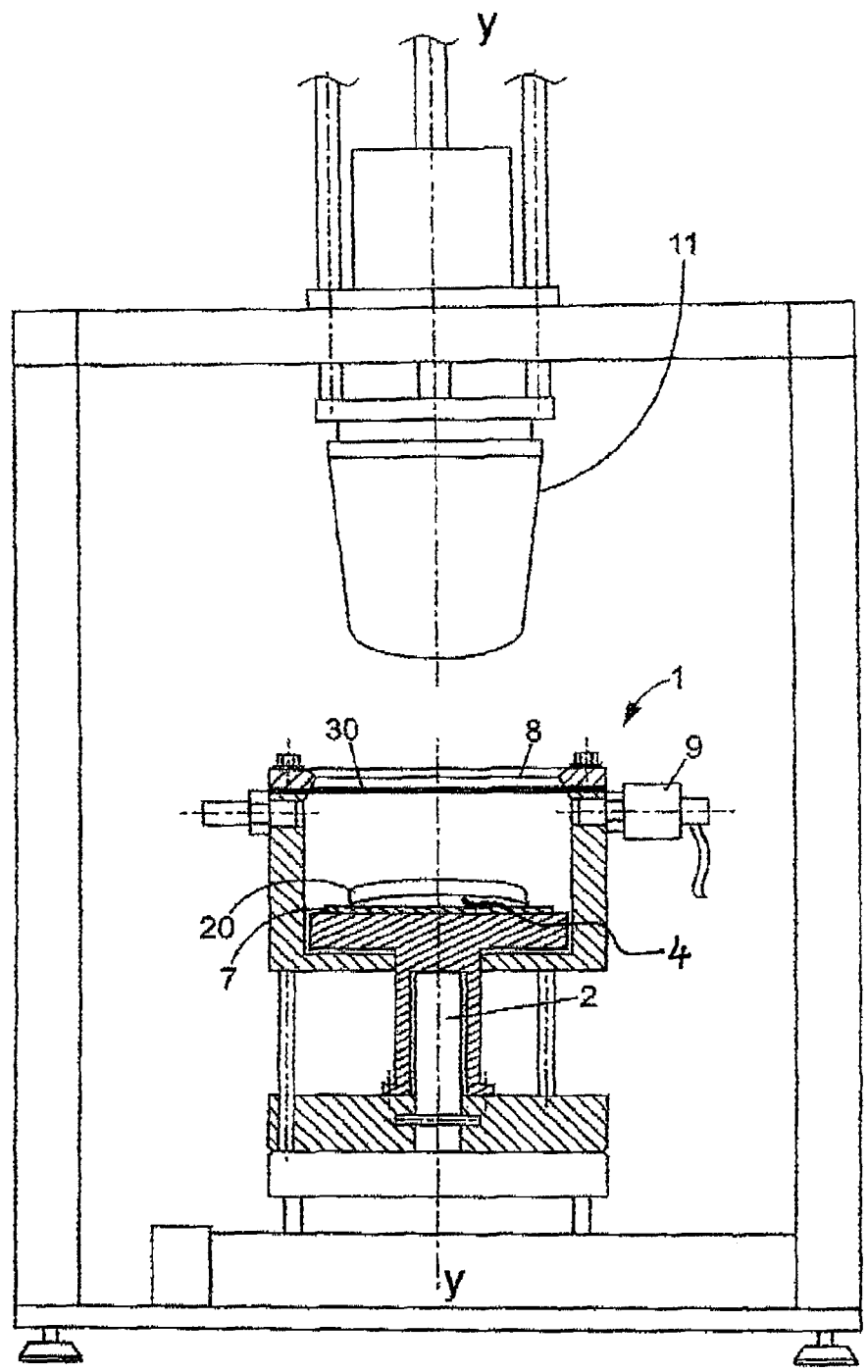
FIG. 7, is a schematic view of an apparatus suitable for transferring a PSA layer from a PSA layer coated liner on a carrier.

Then, the HMC carrier 20 resting on support element 4 is placed on a supporting plate 7 of conforming unit 1 of the apparatus of FIG. 7.

A Nitto Denko PSA film CS 9621 comprising a film bearing a PSA layer 30 is placed on a separable film supporting element 8 of conforming unit 1 of the apparatus of FIG. 7, the PSA layer being intended to face the HMC stack of the carrier 20.

A removable heating unit (not represented) is placed on the film supporting element (8).

This unit allows, by using heated air convection, to increase the temperature of the PSA film to 145° C.

When this temperature is reached, the whole assembly comprising the film supporting element 8/removable heating unit/film 30, is positioned on conforming unit 1 and blocked at its periphery by a blocking means 9.

No vacuum is used in this embodiment.

A hollow silicon pad 11 having an ovoid shape (having a curve radius of about 43 mm and a hardness 54 shore 00) vertically slidable along to a vertical axis yy is moved downwardly to come into contact with film 30.

Figure 8:
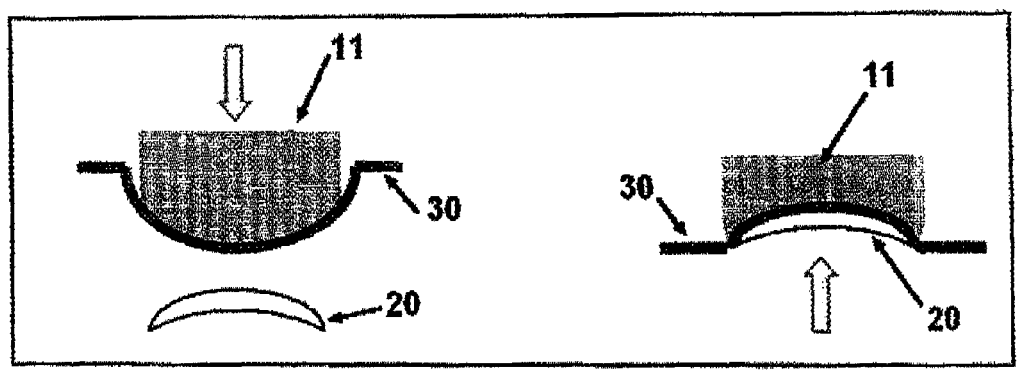
FIG. 8, schematically illustrates the transfer process of a PSA layer from a PSA layer coated liner on a carrier.

The moving speed of pad 11 along axis yy is 3 mm/sec. As shown in FIG. 8, pad 11 is stopped when it reaches the position −30 mm (measured on the yy axis from the initial position of the center of film 30 corresponding to a pre-deformation of film 30 by pad 11).

Then, in a second step, HMC carrier 20 is moved vertically upwards at a speed of 3 mm/second by acting the plunger 2 on which the HMC carrier 20 and the supporting element 4 are placed.

This vertical translation stops upon reaching a complete conformal contact between the film/PSA layer/HMC carrier is reached.

This complete conformal contact is reached when the position of the center of the PSA film is +10 mm (measured on the yy axis from the initial position of the center of the PSA) and is corresponding to a pressure exerted on the film of 80 N.

The pressure is maintained during 5 seconds then the heating unit is stopped.

The pad 11 is then moved vertically upwards at a speed of 14 mm/sec.

The HMC carrier 20 having in this order: liner/PSA/HMC/carrier is removed from apparatus 1.

The liner is then cut at the periphery of the carrier.

3) HMC Transfer.

A 4.5 base PSA adhered HMC carrier with its protection liner as obtained in step 2 above, and after removal of the protection liner, is applied onto the backside of the +1.75 PC lens whose back curve is 3.90 and then laminated in a small press apparatus under inflatable membrane pressure of 1.26 bar (18 PSI) for 2 minutes. After that, the pressure is released and carrier is removed from the lens leaving the HMC layer completely transferred to the backside of the lens. Thanks to the PSA adhesive layer, there no UV or thermal treatment is involved in this transfer process. The total transfer process is completed in a very short time.

The invention claimed is:

1. A process for transferring at least one coating onto at least one geometrically defined surface of a lens substrate comprising:
   (a) obtaining a carrier having a main surface bearing at least one functional coating;
   (b) obtaining a lens substrate having at least one geometrically defined surface;
   (c) depositing, either on said at least one functional coating or said at least one geometrically defined surface of the lens substrate, a layer of a transparent adhesive composition;
   (d) bringing said layer of transparent adhesive composition to a pre-cured or hardened state by UV radiation or by drying the layer at a temperature ranging from 40° C. to 130° C. at which the layer becomes unflowable under the process conditions if said layer has not already been transferred in a dry form from a separable film supporting element at the end of step (c), such that the layer of transparent adhesive composition is no longer significantly spreadable;
   (e) moving the carrier and the lens substrate relatively to each other to bring the layer of transparent adhesive composition into direct contact with either said at least one geometrically defined surface of the lens substrate or said at least one functional coating;
   (f) pressing together the layer of transparent adhesive composition and either said at least one functional coating or said at least one geometrically defined surface of the lens substrate;
   (g) stopping pressing step (f); and
   (h) withdrawing the carrier to recover the lens substrate coated with said at least one functional coating adhering to said at least one geometrically defined surface through the layer of transparent adhesive composition,
   wherein step (d) is performed prior to steps (e) and (f).

2. The process of claim 1, wherein in the recovered coated lens substrate, the layer of transparent adhesive composition is of uniform thickness.

3. The process of claim 1, wherein the thickness of the layer of the transparent adhesive composition ranges from 0.5 to 20 μm.

4. The process of claim 1, wherein the transparent adhesive composition is selected from the group consisting of pressure-sensitive adhesives (PSA) and hot-melt adhesives (HMA).

5. The process of claim 4, wherein the PSAs are selected from polyacrylate based PSAs and styrenic block copolymers based PSAs.

6. The process of claim 4, wherein the hot-melt adhesives are selected from dry poly(meth)acrylic latexes, polyurethane latexes, polyester latex and mixtures thereof.

7. The process of claim 1, wherein the layer of transparent adhesive composition is deposited by spin coating.

8. The process of claim 1, wherein said at least one functional coating is selected from the group consisting of an anti-fouling top coat, an anti-reflection coating, an abrasion- and/or scratch-resistant coating and an impact-resistant coating.

9. The process of claim 1, wherein the main surface of the carrier bears a stack of several functional coatings.

10. The process of claim 9, wherein the stack of several functional coatings comprises, starting from the carrier main surface an anti-fouling top coat layer, an anti-reflection coating layer, an abrasion- and/or scratch-resistant coating layer and optionally an impact-resistant primer coating layer.

11. The process of claim 10, wherein the impact resistant primer coating layer is the transparent adhesive composition layer.

12. The process of claim 1, wherein the transparent adhesive composition layer acts as an impact-resistant coating.

13. The process of claim 1, wherein the carrier is a flexible carrier.

14. The process of claim 13, wherein the flexible carrier is made of a thermoplastic material.

15. The process of claim 14, wherein the thermoplastic material is polycarbonate.

16. The process of claim 13, wherein the flexible carrier has a thickness of 0.2 to 5 mm.

17. The process of claim 13, wherein the carrier has a spherical shape and the lens substrate geometrically defined surface is a spherical, tonic or progressive surface.

18. The process of claim 1, wherein pressing step (f) is performed by applying an air pressure to the carrier.

19. The process of claim 1, wherein pressing step (f) is performed by application of vacuum.

20. The process of claim 1, wherein the transparent adhesive composition is a pressure-sensitive adhesive composition and no heat is applied during pressing step (f).

21. The process of claim 1, wherein the transparent adhesive composition is a hot-melt adhesive composition and heat is applied during pressing step (f).

22. The process of claim 21, wherein applied heat ranges from 50 to 120° C.

23. The process of claim 21, wherein heat is applied for 3 to 30 minutes.

24. The process of claim 1, wherein the lens substrate is made of polycarbonate, thermoplastic or thermosetting polyurethanes, polythiourethanes, polyepoxides, polyepisulfides, poly(meh)acrylates, diethylene glycol bis(allylcarbonate)copolymers, copolymers thereof and blends thereof.

25. The process of claim 24, wherein the geometrically defined surface is pre-treated by a corona discharge treatment.

26. The process of claim 1, wherein the layer of transparent adhesive composition has a thickness difference between the maximum thickness and the minimum thickness of the layer which is not more than 2 µm.

27. The process of claim 1, wherein the layer of transparent adhesive composition has a thickness difference between the maximum thickness and the minimum thickness of the layer which is not more than 1 µm.

28. The process of claim 1, wherein said layer of transparent adhesive composition is pre-cured or hardened by UV radiation prior to steps (d) and (e).

29. The process of claim 1, wherein said layer of transparent adhesive composition is pre-cured or hardened by drying the layer at a temperature ranging from 40° C. to 130° C. prior to steps (d) and (e).

* * * * *

UNITED STATES PATENT AND TRADEMARK OFFICE
CERTIFICATE OF CORRECTION

| | | |
|---|---|---|
| PATENT NO. | : 8,435,378 B2 | Page 1 of 1 |
| APPLICATION NO. | : 13/009598 | |
| DATED | : May 7, 2013 | |
| INVENTOR(S) | : Bergon et al. | |

It is certified that error appears in the above-identified patent and that said Letters Patent is hereby corrected as shown below:

On the title page, item (73) Assignee, line 2, delete "General" and insert --Generale-- therefor.

Signed and Sealed this
Eleventh Day of June, 2013

Teresa Stanek Rea
*Acting Director of the United States Patent and Trademark Office*